April 12, 1966

C. W. GEAR 3,246,315

READ ONLY MEMORY

Filed Oct. 6, 1961

2 Sheets-Sheet 1

INVENTOR
CHARLES W. GEAR

BY Joe L. Koerber
ATTORNEY

United States Patent Office 3,246,315

Patented Apr. 12, 1966

3,246,315

READ ONLY MEMORY

Charles W. Gear, Eastleigh, Hants, England, assignor to International Business Machines Corporation, New York, N.Y., a corporation of New York Filed Oct. 6, 1961, Ser. No. 143,419
14 Claims. (Cl. 340—347)

This invention relates to a catalog memory of the pre-wired or read-only type, and more particularly to such memories for producing parallel outputs on a plurality of output lines in response to parallel inputs to a plurality of other lines.

Devices are well known for producing an output on selected individual lines in response to inputs to a plurality of lines whereby, for example, decimal outputs representing digits 1–7 and 0 may be obtained selectively on eight lines in response to inputs on various combinations of three binary coded lines representing respective binary bits 4, 2 and 1.

The present invention is directed to a read-only memory in which a plurality of coded input lines are activated selectively to produce a coded output on a plurality of output lines. A primary advantage of this memory is the large reduction of components needed to read out the proper memory words corresponding to a given set of tags. The outputs may be made unique for each coded input or, if desired, may be the same for more than one coded input.

It also is known to provide apparatus for converting from one code to another, for example, from a code consisting variously of one, two or three of a possible twelve code bit per character to a uniform two-out-of-twelve code. The principles of the present invention may also be utilized to construct reduced component code converters.

One object of this invention is to provide a read only catalog memory utilizing a number of components that is small compared to the usual number required in this type of circuit.

Another object of this invention is to provide an improved code converter.

A further object of this invention is to provide a catalog memory wherein a particular catalog entry may be extracted in response to different interrogation inputs.

A specific object of this invention is to provide a device for generating binary excess-three code representations in response to binary code inputs.

The foregoing and other objects, features and advantages of this invention will be apparent from the following more particular description of preferred embodiments of the invention, as illustrated in the accompanying drawings.

A catalog memory of the read-only type is provided to which parallel inputs, for example in binary coded form, are applied to provide voltages on related intermediate lines. These voltages applied to impedance circuits are detected by threshold discriminating devices to produce outputs in coded form on a plurality of output lines.

The circuit may be arranged to provide a unique multi-line output for each different input combination or may be arranged to provide identical outputs for certain different inputs.

Figure 1:
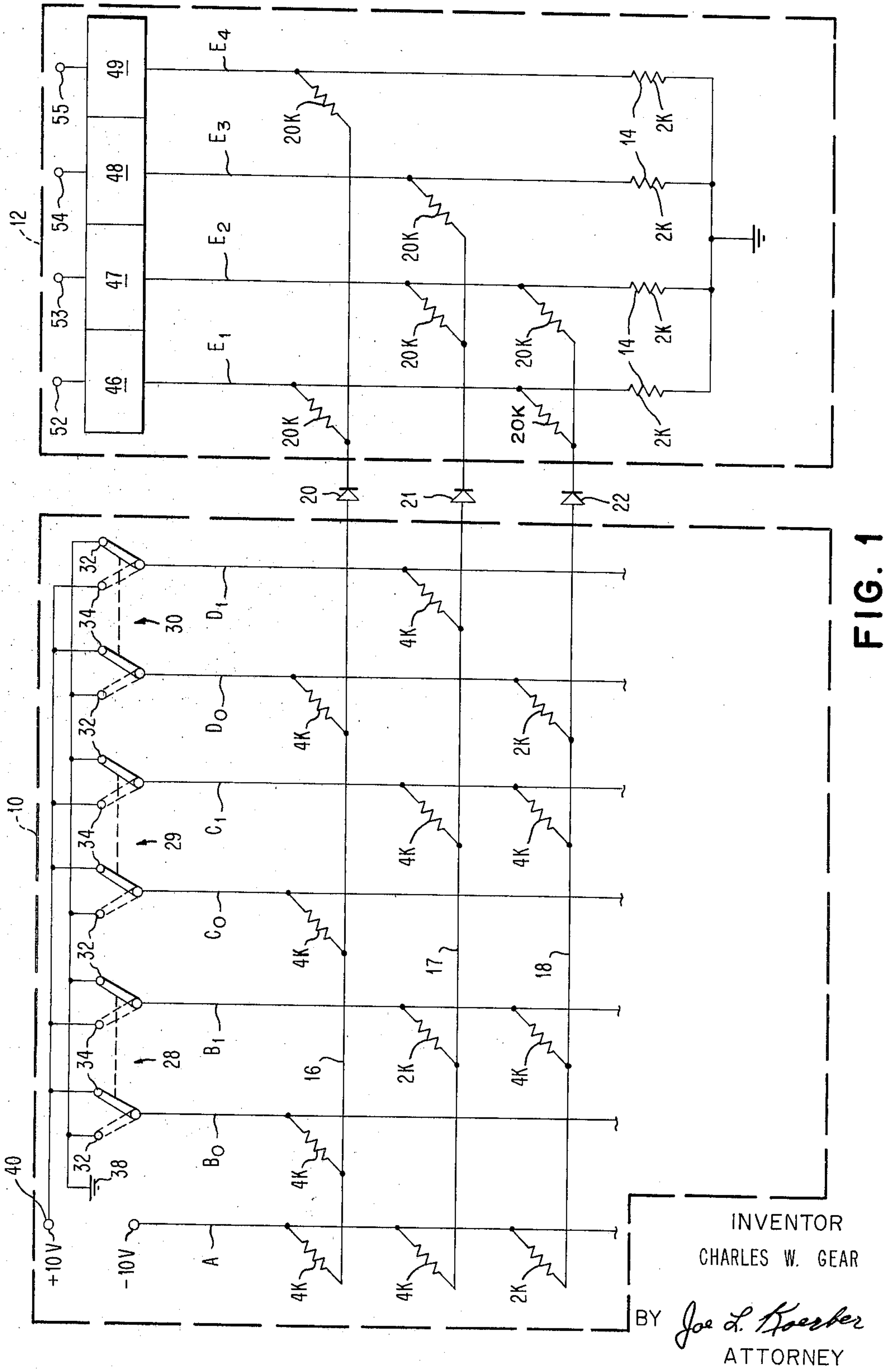
FIGURE 1 is a circuit schematic of one embodiment of the invention.

Referring to FIGURE 1, a circuit is shown which consists of a left-hand input section 10 and a right-hand output section 12. The input section section 10 includes a bias line A and three pairs of vertical input lines $B_0$–$B_1$, $C_0$–$C_1$ $D_0$–$D_1$. The output section 12 includes four vertical output lines designated $E_1$, $E_2$, $E_3$ and $E_4$. In the lower portion of section 12, the four lines $E_1$ through $E_4$ are connected through individual 2K ohm resistors 14 to ground. Three horizontal lines 16, 17 and 18 extend through both the input and output sections. Diodes 20, 21 and 22 are inserted in the respective lines 16, 17 and 18 between the sections 10 and 12. The forward and reverse resistances of these diodes are approximately 70 ohms and 100K ohms respectively. The circuit is such that current will flow from left to right through any one of the diodes at any time that a positive potential is present on the corresponding line to the left of that particular diode and current will not flow when the potential to the left of the diode is zero or negative.

The bias line A is connected to a minus 10 volt supply (−10 v.) whereas the lines $B_0$–$B_1$, $C_0$–$C_1$ and $D_0$–$D_1$ are selectively connectable through double pole switches 28, 29 and 30 to terminals 32 and 34, depending upon whether a binary 1 or binary 0 is to be represented by a particular pair of lines. Terminals 32 are connected to ground (0 volts) at point 38, whereas terminals 34 are connected to a positive ten volt supply (+10 v.) at point 40.

Of each pair of lines $B_0$–$B_1$, $C_0$–$C_1$ and $D_0$–$D_1$, one line of the pair will be connected to the +10 volts supply and the other to the zero volt supply at all times. For example, with $B_0$ connected to the +10 volt supply and $B_1$ connected to the zero volt supply, the binary digit 0 is represented. When the line $B_0$ is connected to zero volt supply and the line $B_1$ is connected to a +10 volt supply, the binary digit 1 is represented. Binary 1's and binary 0's are similarly represented by +10 and zero volts connected to the other pairs of input lines.

Lines A, $B_0$, $C_0$ and $D_0$ are connected to line 16 through individual 4K ohm resistors whereas lines $E_1$ and $E_4$ are connected to line 16 through 20K ohm resistors. Lines A, $C_1$ and $D_1$ are connected to line 17 through individual 4K ohm resistors; line $B_1$ is connected to line 17 through a 2K ohm resistor; and lines $E_2$ and $E_3$ are connected to line 17 through individual 20K ohm resistors. Lines A and $D_0$ are connected to line 18 through 2K ohm resistors; lines $B_1$ and $C_1$ are connected to line 18 through 4K ohm resistors; and lines $E_1$ and $E_2$ are connected to line 18 through individual 20K ohm resistors.

Referring to section 12 of FIG. 1, discriminating devices 46, 47, 48 and 49 are connected to the respective lines $E_1$, $E_2$, $E_3$ and $E_4$ at tap points between the 20K ohm and 2K ohm resistors. The 20K ohm and 2K ohm resistors act as a voltage divider to impress a voltage upon the associated discriminating devices. These latter devices may be any conventional discriminting devices adjusted to be actuated by input voltages equal to or greater than a selected discriminating level (0.15 volt in the following example), and to be unaffected by voltages below that level. When a particular device 46, 47, 48 or 49 is activated, an output is produced at a corresponding terminal 52, 53, 54 or 55.

The voltages on the lines 16, 17 and 18 will vary in accordance with the connections of the switches 28, 29 and 30 to the 0 volt and +10 volt supplies. The voltage under any given condition may be calculated in accordance with Kirchhoff's laws. The resistor values, the resistor connections, the applied potentials and the discriminating levels may be selected to provide the desired output combinations.

In a circuit, such as that in FIGURE 1, having a three-bit input (in this case, three pairs of input lines $B_0$–$B_1$, $C_0$–$C_1$, and $D_0$–$D_1$), there are eight possible input combinations comprising the binary values 0–7. Accordingly there are eight possible output combinations corresponding to the eight input combinations. However, such a circuit may be arranged to obtain the same output combination for two or more different input combinations. It will be apparent that other read-only memories may be constructed within the scope of this invention having different numbers of input and output lines and utilizing other codes.

The circuit shown in FIGURE 1 has been arranged so that a binary coded decimal input 0 (000) gives a binary 9 output (1001) on output terminals 52–55; a binary 1 input (001) also gives a binary 9 output; a binary 2 input (101) gives a binary 13 output (1101); a binary 3 input (011) gives a binary 6 output (0110); a binary 4 input (100) gives a binary 15 output (1111); a binary 5 input (101) gives a binary 6 output; a binary 6 input (110) gives a binary 14 output (1110); and a binary 7 input (111) gives a binary 6 output. Thus, the inputs 3, 5 and 7 all produce binary 6 outputs. Such an arrangement may be desired where several tags (such as 3, 5 and 7) are associated with the same data (6) and it is desired to extract the value 6 in response to any interrogation 3, 5 or 7. An example of such an operation may be where the input values represent species of a generic group and the output represents the generic group, whereby the interrogation input of any species will result in the correct generic group output.

The average impedance of the circuit to the right of the diodes is of the order of 10K ohms or about ten times the average impedance to the left of the diodes. Thus, to determine the voltages on the horizontal lines to the left of the diodes to a first approximation, the right half of the circuit may be ignored.

The approximate potentials of the lines 16, 17 and 18, in FIGURE 1, are shown in the chart below for the various binary inputs on lines $B_0$–$B_1$, $C_0$–$C_1$ and $D_0$–$D_1$.

| Input | Line 16 | Line 17 | Line 18 |
|---|---|---|---|
| 000 | +5.0 | −2.0 | 0 |
| 001 | +2.5 | 0 | −3.3 |
| 010 | +2.5 | 0 | +2.2 |
| 011 | 0 | +3.3 | −3.6 |
| 100 | +2.5 | +3.4 | +2.2 |
| 101 | 0 | +5.0 | −3.3 |
| 110 | 0 | +5.0 | +3.3 |
| 111 | −2.5 | +6.0 | 0 |

All zero and negative potentials are ineffective since they are blocked by the diodes 20–22. Therefore, the effective lines in the output block 12 for the various inputs are shown in the following chart, along with the binary output at terminals 52–55.

| Input | Line 16 | Line 17 | Line 18 | Output |
|---|---|---|---|---|
| 000 | X | -------- | -------- | 1001 |
| 001 | X | -------- | -------- | 1001 |
| 010 | X | -------- | X | 1101 |
| 011 | -------- | X | -------- | 0110 |
| 100 | X | X | X | 1111 |
| 101 | -------- | X | -------- | 0110 |
| 110 | -------- | X | X | 1110 |
| 111 | -------- | X | -------- | 0110 |

For a binary 0 input (000), for example, only the diode 20 would conduct and impose approximately +5.0 volts to the right of the diode. This comprises approximately —.25 volt on discriminator devices 46 and 49. Actually, this would also induce a voltage of the order of 0.0125 volt on line $E_2$, but this is below the selected discrimination level of 0.05 volt and hence is interpreted as a zero.

It will be apparent that the output combinations from section 12 may be altered in one of several ways, for example, by changing the number or values or locations or resistors in the input section 10 or the output section 12; by changing the applied potentials; by changing the discrimination level; or by various combinations of these changes.

Figure 2:
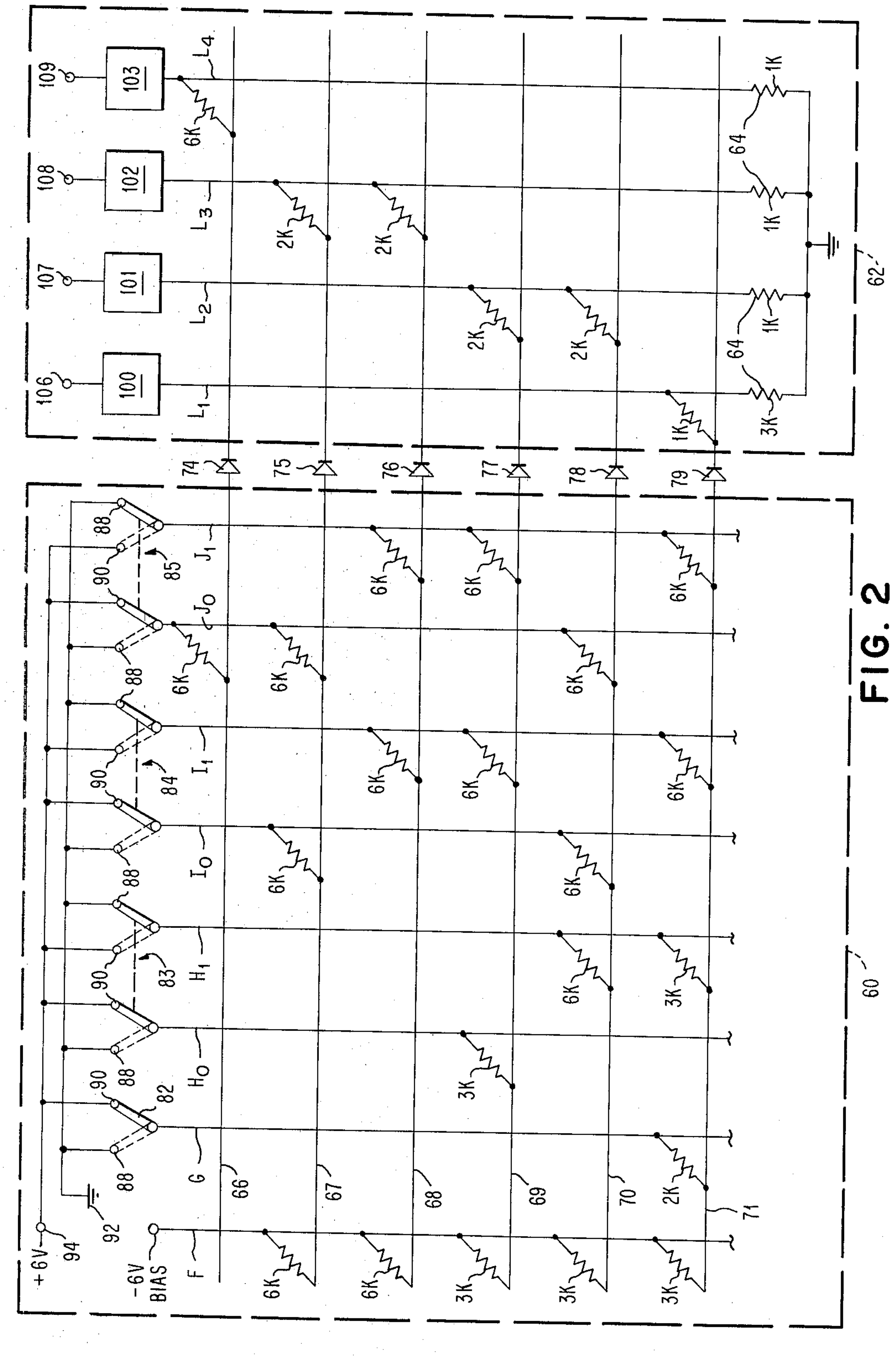
FIGURE 2 shows another embodiment of the invention.

Referring to FIGURE 2, a circuit is illustrated which produces an excess-three code. For example, a zero input produces a three output; a one input produces a four output; a two input produces a five output; etc. The use of an excess-three code in the computer art is a known expedient. It will be apparent that code converting devices other than for the excess-three code may be constructed within the scope of this invention.

The circuit in FIGURE 2 consists of a left-hand input section 60 and a right-hand output section 62. The input section 60 includes eight vertical lines as follows: a bias line F, a single line designated G, a pair of lines designated $H_0$ and $H_1$, a pair of lines designated $I_0$ and $I_1$, and a pair of lines designated $J_0$ and $J_1$. The output section 62 includes four vertical lines designated $L_1$, $L_2$, $L_3$, and $L_4$. Lines $L_2$, $L_3$ and $L_4$ are connected through individual 1K ohm resistors to ground whereas $L_1$ is connected through a 3K ohm resistor to ground. These latter four resistors are designated generally 64.

Six horizontal lines designated 66, 67, 68, 69, 70 and 71 extend through both input and output sections 60 and 62. Diodes 74, 75, 76, 77, 78 and 79 are inserted in the lines 66–71 at points between the sections 60 and 62. The forward and reverse resistances of the diodes are approximately 70 ohms and 100K ohms respectively. The circuit is such that current will flow from left to right through any one of the diodes at any time that a positive potential is present to the left of that particular diode, but current will not flow where the potential to the left of the diode is zero or negative.

The bias line F is connected to a minus 6 volt (−6 v.) bias supply and is connected to various ones of the horizontal lines through individual impedances as follows. Through 6K ohm resistors to lines 67 and 68; to 3K ohm resistors to lines 69, 70 and 71. Line G is connected through a 2K ohm resistor to line 71. Line $H_0$ is connected through a 3K ohm resistor to line 69. Line $H_1$ is connected through a 6K ohm resistor to line 70 and through a 3K ohm resistor to line 71. Line $I_0$ is connected through 6K ohm resistors to lines 67 to 70. Line $I_1$ is connected through 6K ohm resistors to lines 68, 69 and 71. Line $J_0$ is connected through 6K ohm resistors to lines 66, 67 and 70. Line $J_1$ is connected through 6K ohm resistors to lines 68, 69 and 71. Line $L_1$ is connected through a 1K ohm resistor to line 71. Line $L_2$ is connected through 2K ohm resistors to lines 69 and 70. Line $L_3$ is connected through 2K ohm resistors to lines 67 and 68. Line $L_4$ is connected through a 6K ohm resistor to line 66.

Lines G, $H_0$, $H_1$, $I_0$, $J_0$ and $J_1$ are connected to switches 82, 83, 84 and 85 which are connectable selectively to associated terminals 88 and 90. The terminals 88 are common connected to ground at point 92 and therefore are at a 0 volt potential. The terminals 90 are common connected to a +6 volt supply at 94. It will be noted that switches 83, 84 and 85 are double pole switches and are associated with pairs of lines $H_0$–$H_1$, $I_0$–$I_1$, and $J_0$–$J_1$ respectively whereby, when one line of a pair is connected to a terminal 88, the other line is connected to a terminal 90.

Lines $L_1$, $L_2$, $L_3$ and $L_4$ are individually connected to output devices 100, 101, 102 and 103, such as the discriminating devices 46, 47, 48 and 49 in FIGURE 1. When a voltage equal to or greater than the predetermined discrimination level is imposed on a line $L_1$, $L_2$, $L_3$, or $L_4$, the associated sensing device 100, 101, 102, or 103 will be activated to produce an output at a corresponding terminal 106, 107, 108 or 109.

Except in the cases of lines G and $H_0$, parallel resistance circuits will exist between terminals 88 or 90 and line F through the various resistors connected to these lines. In the case of each line G and $H_0$, there will be a series circuit from the line G or $H_0$ through a resistor to the line 71 or 69 and then through another resistor to the line F. Voltage drops across these various resistors establish various potentials on the horizontal lines 66–71. When a positive potential exists on one or more of these horizontal lines to the left of one of the diodes, diodes in those lines will conduct and current will flow through corresponding resistors to the corresponding lines $L_1$, $L_2$, $L_3$ and $L_4$ and thence through corresponding resistors 64 to ground. The voltage drop across one of the latter pairs of resistors, if the voltage at a tap point between these resistors equals or exceeds 0.15 volt, activates the corresponding discriminating device 100, 101, 102 or 103 to produce an output at a corresponding terminal 106, 107, 108 or 109.

Referring to the following chart, column one illustrates ten binary input combinations which may be applied to line G and pairs of lines $H_0$–$H_1$, $I_0$–$I_1$, and $J_0$–$J_1$. Column two illustrates the measured potentials at the tap points of lines $L_1$–$L_4$. Column three illustrates the effective outputs from the devices 100–103, where 1 represents an output and 0 represents no output.

| Column 1 | | | | Column 2 | | | | Column 3 | | | |
|---|---|---|---|---|---|---|---|---|---|---|---|
| Inputs | | | | Measured Voltages | | | | Outputs ($1 \geq .15$ volt) | | | |
| G | $H_0$–$H_1$ | $I_0$–$I_1$ | $J_0$–$J_1$ | $L_1$ | $L_2$ | $L_3$ | $L_4$ | 106 | 107 | 108 | 109 |
| 0 | 0 | 0 | 0 | 0 | 0 | .33 | .42 | 0 | 0 | 1 | 1 |
| 0 | 0 | 0 | 1 | 0 | .20 | 0 | 0 | 0 | 1 | 0 | 0 |
| 0 | 0 | 1 | 0 | 0 | .18 | 0 | .42 | 0 | 1 | 0 | 1 |
| 0 | 0 | 1 | 1 | 0 | .40 | .33 | 0 | 0 | 1 | 1 | 0 |
| 0 | 1 | 0 | 0 | 0 | .22 | .33 | .42 | 0 | 1 | 1 | 0 |
| 0 | 1 | 0 | 1 | .29 | 0 | 0 | 0 | 1 | 0 | 0 | 0 |
| 0 | 1 | 1 | 0 | .29 | 0 | 0 | .42 | 1 | 0 | 0 | 1 |
| 0 | 1 | 1 | 1 | .66 | 0 | .33 | 0 | 1 | 0 | 1 | 0 |
| 1 | 0 | 0 | 0 | .30 | 0 | .33 | .42 | 1 | 0 | 1 | 1 |
| 1 | 0 | 0 | 1 | .64 | .18 | 0 | 0 | 1 | 1 | 0 | 0 |

Referring to the inputs to lines G, $H_0$–$H_1$, $I_0$–$I_1$, and $J_0$–$J_1$, the input to line G is designated 0 when connected to terminal 88 and 1 when connected to terminal 90. The input to a pair of lines $H_0$–$H_1$, $I_0$–$I_1$ or $J_0$–$J_1$ is designated 0 when the line $H_0$, $I_0$ or $J_0$ is connected to a terminal 90 and 1 when this line is connected to a terminal 88. It is noted that the other line of each pair is always connected to an opposite terminal whereby one line of a pair is connected to 0 volts while the other is connected to +6 volts. Thus, with the pair of lines $H_0$–$H_1$ set to 0, current flows in line $H_0$; when set to 1, current flows in line $H_1$.

While the invention has been particularly shown and described with reference to preferred embodiments thereof, it will be understood by those skilled in the art that various changes in form and details may be made therein without departing from the spirit and scope of the invention.

What is claimed is:

1. A matrix translator for deriving predetermined data outputs on plural output lines in response to predetermined data inputs on plural input lines comprising a plurality of input lines, a group of current responsive means, at least one connected to each of said input lines, each operative to produce a voltage drop thereacross and having an intermediate voltage tap point, means for selectively impressing currents on different combinations of said lines and said current responsive means in accordance with an input in a fixed-number-of-elements code, a group of second current responsive means, each operative to produce a voltage drop thereacross, and having an intermediate voltage tap point, rectifier means connecting selected tap points of said first current responsive means to selected ones of said second current responsive means, and a group of output lines connected to said intermediate tap points of said group of second current responsive means, whereby a predetermined output in a fixed-number-of-elements code is derived on said group of output lines in accordance with each said input.

2. A matrix translator for deriving predetermined data outputs on plural output lines in response to predetermined data inputs on plural input lines comprising a plurality of input lines, a group of first voltage divider means, at least one connected to each of said input lines and each having an intermediate tap point, means for selectively impressing currents on different combinations of said lines and said divider means in accordance with an input in a fixed-number-of-elements code, a group of second voltage divider means, each having an intermediate tap point, rectifier means connecting selected tap points of said first voltage divider means to selected ones of said second voltage divider means, and a group of output lines connected to said intermediate tap points of said group of second voltage divider means, whereby a predetermined output in a fixed-number-of-elements code is derived on said group of output lines in accordance with each said input.

3. A matrix translator for deriving predetermined data outputs on plural output lines in response to predetermined data inputs on plural input lines comprising a plurality of input lines, a group of current responsive means, at least one connected to each of said input lines, each operative to produce a voltage drop thereacross and having an intermediate voltage tap point, means for selectively impressing currents on said lines and said current responsive means in accordance with an input in a fixed-number-of-elements code, a group of second current responsive means, each operative to produce a voltage drop thereacross, and having an intermediate voltage tap point, means connecting selected tap points of said first current responsive means to selected ones of said second current responsive means whereby induced voltage of a given polarity at a said tap point of a said first current responsive means causes current to flow in connected said second current responsive means, and a group of output lines connected to said intermediate tap points of said group of second current responsive means, whereby a predetermined output in a fixed-number-of-elements code is derived on said group of output lines in accordance with each said input.

4. A matrix translator for deriving predetermined data outputs on plural output lines in response to predetermined data inputs on plural input lines comprising a plurality of input lines, a group of current responsive means, at least one connected to each of said input lines, each operative to produce a voltage drop thereacross and having an intermediate voltage tap point, means for selectively impressing currents on different combinations of said lines and said current responsive means in accordance with an input in a fixed-number-of-elements code, a group of second current responsive means, each operative to produce a voltage drop thereacross, and having an intermediate voltage tap point, rectifier means connecting selected tap points of said first current responsive means to selected ones of said second current responsive means, and a group of voltage level discriminating means connected to said intermediate tap points of said group of second current responsive means, whereby a predetermined output in a fixed-number-of-elements code is derived from said group of voltage level discriminating means in accordance with each said input.

5. A catalog memory system comprising, in combination, an input section including a plurality of input lines, a plurality of first current responsive means, at least one connected to each said line, each operative to produce a voltage drop thereacross and having an intermediate voltage tap point, means for selectively impressing currents on different combinations of said lines in accordance with an input in a fixed-number-of-elements code; an output section including a plurality of second current responsive means each operative to produce a voltage drop thereacross and having an intermediate voltage tap point; means connecting selected tap points of said first group of current responsive means with selected ones of said second group of current responsive means whereby the application of voltage at a given polarity of a said tap point of a said first current responsive means causes current to flow in connected said second current means; and output means connected to said tap points of said second current responsive means whereby a predetermined output in a fixed-number-of-elements code is derived from said group of output means in accordance with each said input.

6. A code converter for converting binary coded digital data inputs to an excess-three code comprising a plurality of input lines for receiving the binary coded digital data, a group of first voltage divider means, at least one connected to each of said input lines and each having an intermediate tap point, means for selectively impressing currents on different combinations of said lines and said divider means in accordance with the binary coded digital input data, a group of second voltage divider means, each having an intermediate tap point, rectifier means connecting selected tap points of said first voltage divider means to selected ones of said second voltage divider means, and a group of output lines connected to said intermediate tap points of said group of second voltage divider means, to provide on said group of output lines a binary coded digital output having a value higher by three than the input data.

7. The invention of claim 1 wherein the number of elements in said input code is less than the number of elements in said output code.

8. The invention of claim 1 wherein the number of elements in said input code is at least equal to the number of elements in said output code.

9. The invention of claim 1 wherein said predetermined output may be the same for two or more different inputs.

10. A catalog memory system comprising, in combination, an input section and an output section; said input section including $2n$ input lines representative of $n$ binary digits, each of said $2n$ lines being selectively settable to one state and to another state, means pairing said $2n$ lines into $n$ pairs whereby the setting of one line of a pair to said one state and the other line to said other state represents an input binary zero and setting the pair of lines to the opposite states represents an input binary 1, and a plurality of voltage dividers, each of said voltage dividers being connected to at least one of said input lines, each voltage divider having an intermediate tap point and each said voltage divider having a voltage drop thereacross when the connected said line is in said one state; said output section including a plurality of voltage dividers each having an intermediate tap point, means connecting selected tap points of said voltage dividers in said input section to selected ones of said voltage dividers in said output section, and a plurality of output means, each connected to at least one of said tap points of said voltage dividers in said output section, whereby a predetermined combination of outputs is derived at said output means for each combination of inputs to said input lines.

11. The invention of claim 10 wherein at least one of said voltage divider means in said input section, utilized in the circuitry for deriving a particular output in responsse to a particular input is common to the circuitry utilized in deriving other particular outputs in response to other particular inputs.

12. A matrix translator of $n$ digit binary data comprising $2n$ input lines, each of said $2n$ lines being settable to one state and to another state, means pairing said $2n$ lines into $n$ pairs whereby one line of a pair is set to said one state while the other line of the pair is set to said other state to represent a binary zero and said lines are set to the opposite states to represent a binary one, a plurality of voltage divider means, at least one said divider means being connected to each said line and adapted to have a voltage drop thereacross when the connected said line is in said one state, an intermediate tap point on each said divider means, and a plurality of output lines each connected to at least one of said tap points.

13. A multi-digit code translation circuit comprising:
a voltage dividing network including a plurality of input lines;
means for selectively impressing different voltages on different combinations of said input lines whereby current flow is induced in said network; and,
a plurauity of voltage discriminating devices connected to selected points within said network, each of said devices being adapted to produce an output pulse upon the elevation of its respective voltage divider connecting point to a predetermined minimum voltage level, whereby application of different voltage levels to different combinations of said input lines result in the production of output pulses from different combinations of said voltage discriminating devices.

14. A multi-digit code translation circuit comprising:
a first voltage dividing network including a plurality of input lines;
means for selectively impressing different voltages on different combinations of said input lines;
a second voltage dividing network connected to ground potential;
a plurality of current conducting lines connecting said second network to said first network; and,
a plurality of voltage discriminating devices connected to selected points within said second network, said devices each being adapted to produce an output signal upon the elevation of its respective voltage divider connecting point to a predetermined minimum voltage level, whereby application of different voltage levels to different combinations of said input lines result in the production of output pulses from different combinations of said voltage discriminating devices.

References Cited by the Examiner

UNITED STATES PATENTS

| | | | |
|---|---|---|---|
| 2,813,676 | 11/1957 | Boyer et al. | 235—92 |
| 2,864,555 | 12/1958 | Spencer | 340—347 |
| 2,947,971 | 8/1960 | Glauberman | 340—347 |
| 2,949,600 | 8/1960 | Le May | 340—166 |

DARYL W. COOK, *Acting Primary Examiner.*

MALCOLM A. MORRISON, ROBERT C. BAILEY, *Examiners.*

K. R. STEVENS, *Assistant Examiner.*

UNITED STATES PATENT OFFICE
CERTIFICATE OF CORRECTION

Patent No. 3,246,315 April 12, 1966

Charles W. Gear

It is hereby certified that error appears in the above numbered patent requiring correction and that the said Letters Patent should read as corrected below.

Column 1, line 72, strike out "section", second occurrence; column 2, line 2, after "$C_0$-$C_1$" insert a comma; column 6, line 47, after "on" insert -- different combinations of --; line 54, for "induced" read -- the application of --; column 7, line 23, for "at" read -- of --; same line 23, for "of", second occurrenc read -- at --; line 57, for "comprising," read -- comprising: -- line 72, for "point," read -- point; --; column 8, line 1, for "section," read -- section; --; lines 9 and 10, for "responsse" r -- reponse --; line 31, for "and," read -- and --; line 32, for "plurauity" read -- plurality --.

Signed and sealed this 1st day of August 1967.

(SEAL)

Attest:

Edward M. Fletcher, Jr.
Attesting Officer

EDWARD J. BRENNER
Commissioner of Patents